US008732707B2

(12) United States Patent
Greiner et al.

(10) Patent No.: US 8,732,707 B2
(45) Date of Patent: May 20, 2014

(54) COMPOSING AND EXECUTING SERVICE PROCESSES

(75) Inventors: Ulrike Greiner, Fruthwilen (CH); Ingo Weber, Friedrichshafen (DE); York Sure, Karlsruhe (DE); Matthias Born, Karlsruhe (DE); Rainer Ruggaber, Karlsruhe (DE); Marek Kowalkiewicz, Moggill (AU); Christian Brelage, Münster (DE); Ulrike Brecht, Berlin (DE); Rene Fitterer, St. Gallen (CH); Andreas Klein, Weingarten (DE)

(73) Assignee: SAP AG, Walldorf (DE)

( * ) Notice: Subject to any disclaimer, the term of this patent is extended or adjusted under 35 U.S.C. 154(b) by 796 days.

(21) Appl. No.: 12/574,152

(22) Filed: Oct. 6, 2009

(65) Prior Publication Data

US 2010/0088701 A1     Apr. 8, 2010

(30) Foreign Application Priority Data

Oct. 6, 2008 (EP) .................................... 08017494

(51) Int. Cl.
*G06F 9/46* (2006.01)

(52) U.S. Cl.
USPC ........................................................ 718/100

(58) Field of Classification Search
None
See application file for complete search history.

(56) References Cited

U.S. PATENT DOCUMENTS

| 7,024,670 | B1 * | 4/2006 | Leymann et al. ............. 718/102 |
| 7,299,244 | B2 | 11/2007 | Hertling et al. |
| 2004/0111430 | A1 * | 6/2004 | Hertling et al. ............ 707/104.1 |
| 2005/0114677 | A1 * | 5/2005 | Kanai ............................ 713/182 |
| 2006/0069995 | A1 * | 3/2006 | Thompson et al. ............ 715/700 |
| 2007/0150480 | A1 * | 6/2007 | Hwang et al. ................... 707/10 |
| 2010/0242120 | A1 * | 9/2010 | Anderson et al. ................ 726/27 |

FOREIGN PATENT DOCUMENTS

EP     1895453 A1     3/2008

OTHER PUBLICATIONS

European Search Report Received for EP Patent Application No. 08017494.9, mailed on Feb. 3, 2009, 9 pgs.
Berbner, Rainer et al., "An approach for the Management of Service-oriented Architecture (SoA) based Application Systems", Accepted at: Enterprise Modelling and Information Systems Architectures (EMISA 2005), Klagenfurt, Austria, in conjunction with ER 2005, Oct. 2005, 14 pgs.
Doshi, Prashant et al., "Dynamic Workflow Composition using Markov Decision Processes", International Journal on Web Services Research, vol. 2, No. 1, Jan.-Mar. 2005, 28 pgs.

(Continued)

*Primary Examiner* — Gregory A Kessler
(74) *Attorney, Agent, or Firm* — Brake Hughes Bellerman LLP

(57) ABSTRACT

A computer-implemented method for automatically and dynamically composing and executing workflow-based service processes may include receiving a request, the request including a user-selected service type, guided by one or more rules for questionnaire creation, dynamically generating a sequence of one or more electronic inquiries in accordance with the user-selected service type, receiving information based on the sequence of the one or more electronic inquiries, based on the information received, creating a goal for the request by constructing logical state representations of a current state constituting a pre-condition of the goal and of a target state constituting a post-condition of the goal and generating a service process by determining a sequence of services which together fulfill the goal, where the services are selected from a plurality of services such that pre-conditions and post-conditions associated with the selected services together match the pre-condition and the post-condition of the goal.

20 Claims, 6 Drawing Sheets

(56) References Cited

OTHER PUBLICATIONS

Berbner, Rainer et al., "An Approach for Replanning of Web Service Workflows", Americas Conference on Information Systems (AMCIS '06), Aug. 4-6, 2006, 6 pgs.
Berbner, Rainer et al., "An Architecture for a QoS driven composition of Web Service based Workflows", In Networking and Electronic Commerce Research Conference (NAEC 2005), Oct. 2005, 10 pgs.
"Directive 2006/123/EC of the European Parliament and of the Council of Dec. 12, 2006 on services in the internal market", Official Journal of the European Union, Services Directive, Dec. 27, 2006, 33 pgs.
Cabral, Liliana et al., "Mediation of Semantic Web Services in IRS-III", Proceedings First International Workshop on Mediation in Semantic Web Services (MEDIATE 2005), in conjunction with the 3rd International Conference on Service-Oriented Computing (ICSOC 2005), Dec. 12, 2005, pp. 1-16.
EP Examination Report Received for EP Patent Application No. 08017494.9 mailed on Jul. 15, 2009, 4 pgs.
Hoffmann, Jorg et al., "Polynomial-Time Reasoning for Semantic Web Service Composition", In WSCA 2007: Proceedings of the 1st International Workshop on Web Service Composition and Adaptation held in conjunction with the 5th International Conference on Web Services (ICWS-2007), Jul. 2007, 8 pgs.
Drumm, Christian et al., "Semantics Utilized for Process management within and between Enterprises", Super Deliverable D3.2: Dynamic Composition Reasoning Framework and Prototype, Version 2.0, Sep. 30, 2007, 208 pgs.
"Core Components Technical Specification—Part 8 of the ebXML Framework", Version 2.01, United Nations Centre for Trade Facilitation and Electronic Business (UN/CEFACT), Nov. 15, 2003, 113 pgs.
Hoffmann, Jorg et al., "Combining Scalability and Expressivity in the Automatic Composition of Semantic Web Services", Proceedings of the 2008 Eighth International Conference on Web Engineering, Jul. 14-18, 2008, pp. 1-9.
Grahne, Gosta et al., "Process Mediation in an Extended Roman Model", Proceedings First International Workshop on Mediation in Semantic Web Services (MEDIATE 2005), in conjunction with the 3rd International Conference on Service-Oriented Computing (ICSOC 2005), Dec. 12, 2005, pp. 17-34.
Valle, Emanuele D., et al., "The mediator centric approach to Automatic Web Service Discovery of Glue", Proceedings First International Workshop on Mediation in Semantic Web Services (MEDIATE 2005), in conjunction with the 3rd International Conference on Service-Oriented Computing (ICSOC 2005), Dec. 12, 2005, pp. 35-50.
Stollberg, Michael et al., "Mediating Capabilities with Delta-Relations", Proceedings First International Workshop on Mediation in Semantic Web Services (MEDIATE 2005), in conjunction with the 3rd International Conference on Service-Oriented Computing (ICSOC 2005), Dec. 12, 2005, pp. 51-66.
Herault, Colombe et al., "Mediation and Enterprise Service Bus a position paper", Proceedings First International Workshop on Mediation in Semantic Web Services (MEDIATE 2005), in conjunction with the 3rd International Conference on Service-Oriented Computing (ICSOC 2005), Dec. 12, 2005, pp. 67-80.
Euzenat, Jerome "Alignment infrastructure for ontology mediation and other applications", Proceedings First International Workshop on Mediation in Semantic Web Services (MEDIATE 2005), in conjunction with the 3rd International Conference on Service-Oriented Computing (ICSOC 2005), Dec. 12, 2005, pp. 81-95.
Mocan, Adrian et al., "Mappings Creation Using a View Based Approach", Proceedings First International Workshop on Mediation in Semantic Web Services (MEDIATE 2005), in conjunction with the 3rd International Conference on Service-Oriented Computing (ICSOC 2005), Dec. 12, 2005, pp. 97-112.
Kunfermann, Philipp et al., "Lifting XML Schemas to Ontologies—The concept finder algorithm", Proceedings First International Workshop on Mediation in Semantic Web Services (MEDIATE 2005), in conjunction with the 3rd International Conference on Service-Oriented Computing (ICSOC 2005), Dec. 12, 2005, pp. 113-122.
Von Lucke, PD Dr. Joern, et al, "Design Options, Requirements, and Architectural Considerations and Approaches to Points of Single Contact in Accordance with the EU Services Directive", Fraunhofer Institute for Open Communication Systems FOKUS, Premium DLR Project, White Paper, Version 1.0, English (Apr. 2008), 106 pgs.
Picture, "Process Identification and Clustering for Transparency in Reogranising Public Administrations", Picture Project No. 027717, Deliverable No. D7.14, WP7—Dissemination & Exploitation, Version 1.0 (Nov. 2008), 33 pgs.
Picture, "Process Identification and Clustering for Transparency in Reogranising Public Administrations", Picture Project No. 027717, Deliverable No. D4.3, WP4—Development of Process Landscaping Methodology, Final Version (Jul. 2007), 45 pgs.
Receipt for Documents for EP Application No. 08017494.9, mailed Oct. 6, 2008, 7 pages.
Request for Grant of a European Patent for EP Application No. 08017494.9, mailed Oct. 6, 2008, 1 page.
Designation of Inventor for EP Application No. 08017494.9, mailed Oct. 6, 2008, 3 pages.
Response to Communication of Jul. 15, 2009 for EP Application No. 08017494.9, mailed Oct. 14, 2009, 34 pages.
Refund of Fees for EP Application No. 08017494.9, mailed Mar. 6, 2012, 2 pages.
Response to Communication of Feb. 3, 2009 for EP Application No. 08017494.9, mailed May 13, 2009, 11 pages.
Decision to Refuse a European Patent Application for EP Application No. 08017494.9, mailed Nov. 4, 2011, 18 pages.
Provision of a minutes in accordance with Rule 124(4) EPC for EP Application No. 08017494.9, mailed Nov. 3, 2011, 5 pages.
Result of Consultation for EP Application No. 08017494.9, mailed Nov. 2, 2011, 2 pages.
Brief Communication for EP Application No. 08017494.9, mailed Oct. 10, 2011, 2 pages.
Response to Summons to Attend Oral Proceedings for EP Application No. 08017494.9, mailed Oct. 5, 2011, 3 pages.
Response to Summons to Attend Oral Proceedings for EP Application No. 08017494.9, mailed Sep. 5, 2011, 38 pages.
Summons to Attend Oral Proceedings for EP Application No. 08017494.9, mailed Mar. 16, 2011, 10 pages.
Communication Pursuant to Rule 69 EPC for EP Application No. 08017494.9, mailed Apr. 19, 2010, 2 pages.
Designation Fees for EP Application No. 08017494.9, mailed May 13, 2009, 1 page.

* cited by examiner

200

COMPOSING AND EXECUTING SERVICE PROCESSES

CROSS-REFERENCE TO RELATED APPLICATION

This application claims priority under 35 U.S.C. §119 to European Patent Application EP08017494.4, filed Oct. 6, 2008, titled "METHOD, SYSTEM, AND COMPUTER PROGRAM PRODUCT FOR COMPOSING AND EXECUTING SERVICE PROCESSES," which is incorporated herein by reference in its entirety.

TECHNICAL FIELD

The description is generally related to automatic and dynamic workflow generation, management, and processing using services, and particularly to a computer-implemented method, a computer program product, and a computer system for automatically and dynamically composing and executing service processes.

BACKGROUND

Modern technologies for specifying and executing workflow processes such as service processes may be realized using web technologies. For example, workflows can be executed and managed using web services. Service processes may be complex and/or composed processes involving inter-relationships and/or interactions between one or more services. The web services may be provided or offered by one or more service providers. A service may be implemented by at least one web service (e.g., a SOA (Service Oriented Architecture) web service), which is able to exchange messages (e.g., SOAP messages) over a network such as the Internet with other web services. A service process (e.g., a licensing process, processes to get any kind of permits from simple permits such as a permit for fishery to complex permits such as a building permit, processes to service complex information requests from citizens, processes combining at least some kinds of services to start a new business comprising finding an appropriate location, hiring new employees, and/or tax support) may comprise and/or may be composed of a complex sequence of one or more services, where the one or more services are provided by one or more web service providers (e.g., authorities such as a registry office or a local health authority). The one or more services may specify one or more steps or tasks in the service process (e.g. checking a requestor's personal data).

SUMMARY

In one general aspect, a computer-implemented method for automatically and dynamically composing and executing workflow-based service processes is provided. The method may comprise receiving a request (e.g., from a user), the request comprising a user-selected service type, guided by one or more rules for questionnaire creation, dynamically generating, by a processor, a sequence of one or more electronic inquiries in accordance with the user-selected service type, receiving information based on the sequence of the one or more electronic inquiries, based on the information received, creating a goal for the request by constructing logical state representations of a current state constituting a pre-condition of the goal, and of a target state constituting a post-condition of the goal and generating a service process by determining a sequence of services which together fulfill the goal, where the services are selected from a plurality of services such that pre-conditions and post-conditions associated with the selected services together match the pre-condition and the post-condition of the goal.

Accordingly, generating the service process may be performed automatically without further user-based interaction after the user has requested a service and specified a user-selected service type. Furthermore, generating the service process may be performed dynamically based on the goal such that the service process will not be pre-defined. The goal of a service process may be described by a pre-condition and a post-condition. The pre-condition may be specified a formula over one or more ground literals. If necessary for the goal, the post-condition may be specified by a formula over one or more literals. Literals may relate to (possibly negated) logical propositions over zero or more variables and/or constants. The variables and/or constants may be used as parameters. For example, the literal SpanishCitizen(X) states that the variable X is a Spanish citizen. Accordingly, the variable X can be substituted with a constant. In case a literal only comprises constants, it may be referred to as a ground literal. Formulas can be constructed from one or more literals by connecting the one or more literals with logical connectives. Examples of logical connectives may be AND, OR, NOT. Formulas determining a pre-condition and/or a post-condition may be existentially quantified (e.g. referred to the above example: there exists an X such that X is a Spanish citizen).

The pre-condition of the goal may specify or model the current situation of the user. For example, the user is a Spanish citizen with name Pabolo Benitez and he is married to Juanita Benitez, than the pre-condition may be formulated by the ground literals SpanishCitizen(PaboloBenitez) and married (PaboloBenitez, JuanitaBenitez). Furthermore, if for example Pabolo Benitez request for a license to open a café with sale of alcoholic drinks, the post-condition of the goal may be formulated by LiquorLicense(X,PaboloBenitez), where X may be a variable for the café.

The services may be described similar to the goal in terms of their pre-conditions and post-conditions, wherein both the pre-conditions and the post-conditions may be described by formulas over literals. In other words, non ground-literals comprising constants instead of variables may be used to formulated the pre-conditions and the post-conditions of the services. If for a service the same variable occurs in the pre-condition and in the post-condition describing the service, then it may be assumed that the variable may be substituted by the same constant. Therefore, the variable may be referred to as a shared variable. Using shared variables, it may be possible to specify for a service for example that a new license is granted to the user having requested for the license (but not to anybody). Accordingly, using shared variables at least one pre-condition and at least one post-condition describing a service can be related. A service can be applied if its pre-condition is fulfilled. In other words, a service can be applied if there exists a variable substitution for the one or more variables of the pre-condition such that the formula evaluates to true, i.e. such that the pre-condition is satisfied. If a service is applied (e.g., when executing a service process), then the applied service may change the current situation or logical state according to its post-condition. In other words, the logical state may be changed to that of the post-condition after the execution of the service process fulfills the formula of the post-condition. Furthermore, in case a logical background theory is present (e.g., a set of rules which need to be obeyed during execution of the service process), then the logical state after execution of the service must fulfill both the post-condition and the logical background theory. In this case, logical inferences also referred to as reasoning may be used. For example, if the logical ground theory comprises a rule stating that a table is moved together with everything on the table, then moving a table implies moving everything on the table with the table itself. It should be noted that while in practice more steps may be required for the execution of the circumstances, it may be modeled in this way for the purpose of an automatic composition of a service process.

In other words, a service process being specified by a goal comprising a pre-condition and a post-condition is executed by executing the services specifying the service process. Accordingly, an initial situation of the user is described by a logical state in terms of the pre-condition of the goal. Subsequently, the service having a corresponding pre-condition is executed. If the service is fulfilled or satisfied (i.e., if the formula describing the post-condition of the service can evaluate to true), the logical state is changed according the post-condition (and possibly a logical background theory) of the service. Subsequently, a service having an appropriate pre-condition is executed and so on until the post-condition of the goal is fulfilled or satisfied. In case the post-condition of the goal cannot be fulfilled, execution of the service process aborts with failure.

In one exemplary implementation, the Possible Model Approach (PMA) may be used to implement a reasoner or reasoning engine for executing service processes, where changes made to the logical state should be kept minimal. In order to keep the changes minimal, as much as from a logical state before execution of a service is assumed to be still true after execution of the service. Furthermore, it may be assumed that the formulas specifying pre-conditions and post-conditions are in disjunctive normal form (DNF).

Automatic composition or combination of a service process by determining a sequence of services according to a goal may be performed by starting in the current state of the user which may be given by the pre-condition of the goal (i.e. a first state of the logical state to be change from the pre-condition to the post-condition of the goal) and possibly a logical background theory and then searches a path of services to a logical state that satisfies the post-condition of the goal. For implementation of the search algorithms such as best-first search or A* may be used. Furthermore, the search algorithm may be guided by a heuristic function such that the search may be performed in an efficient and scalable manner.

According to another aspect, the plurality of services and their associated pre-conditions and post-conditions may be specified in service descriptions, the service descriptions comprising a grounding to at least one process building block, where the at least one process building block may comprise, in addition to the pre-conditions and the post-conditions of the plurality of services, data concerning the user, one or more service provider units involved in performing at least one activity associated with at least one service, a maximum duration associated with each service of the plurality of services, and costs associated with each service of the plurality of services.

According to yet another aspect, the method may further include parallelizing the service process by determining a plurality of services from the sequence of services of the service process which do not depend on other services of the sequence of services, and by executing the plurality of services in parallel.

According to yet another aspect, generating a service process may further include calculating a maximum service process duration as the sum of durations of each of one or more services from the sequence of services, where the one or more services define a longest path of continuous steps through the service process and/or calculating a maximum cost for the service process as the sum of costs associated with each of the services from the sequence of services.

According to yet another aspect, the method may further include if during execution of the service process an exception occurs, notifying the user, providing the user with one or more options to alter the user-selected service type and after having received additional information according to the altered user-selected service type from the user, generating a modified goal and modifying the service process in accordance with the modified goal.

In another general aspect there is provided a computer-program product comprising computer-readable instructions, which when loaded and run in a computer system and/or computer network system, cause the computer system and/or the computer network system to perform a method as described.

In yet another general aspect, a computer system for composing and executing service processes is provided. The system may include a questionnaire component operable to receive a request from a user, the request comprising a user-selected service type and guided by one or more rules for questionnaire creation, dynamically generate a sequence of one or more electronic inquiries in accordance with the user-selected service type, a goal constructor operable to receive information based on the sequence of the one or more electronic inquiries and based on the information received, create a goal for the request by constructing logical state representations of a current state constituting a pre-condition of the goal, and of a target state constituting a post-condition of the goal and a composition component operable to generate a service process by determining a sequence of services which together can fulfill the goal, wherein the services are selected from a plurality of services such that pre-conditions and post-conditions associated with the selected services together can match the pre-condition and the post-condition of the goal.

According to yet another aspect, the system may be further operable to perform operations according to any one of the above methods.

The subject matter described in this specification can be implemented as a method or as a system, using computer program products or a machine-readable medium, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various machines.

Details of one or more implementations are set forth in the accompanying exemplary drawings and exemplary description below. Other features will be apparent from the description and drawings, and from the claims.

DETAILED DESCRIPTION

Figure 1:
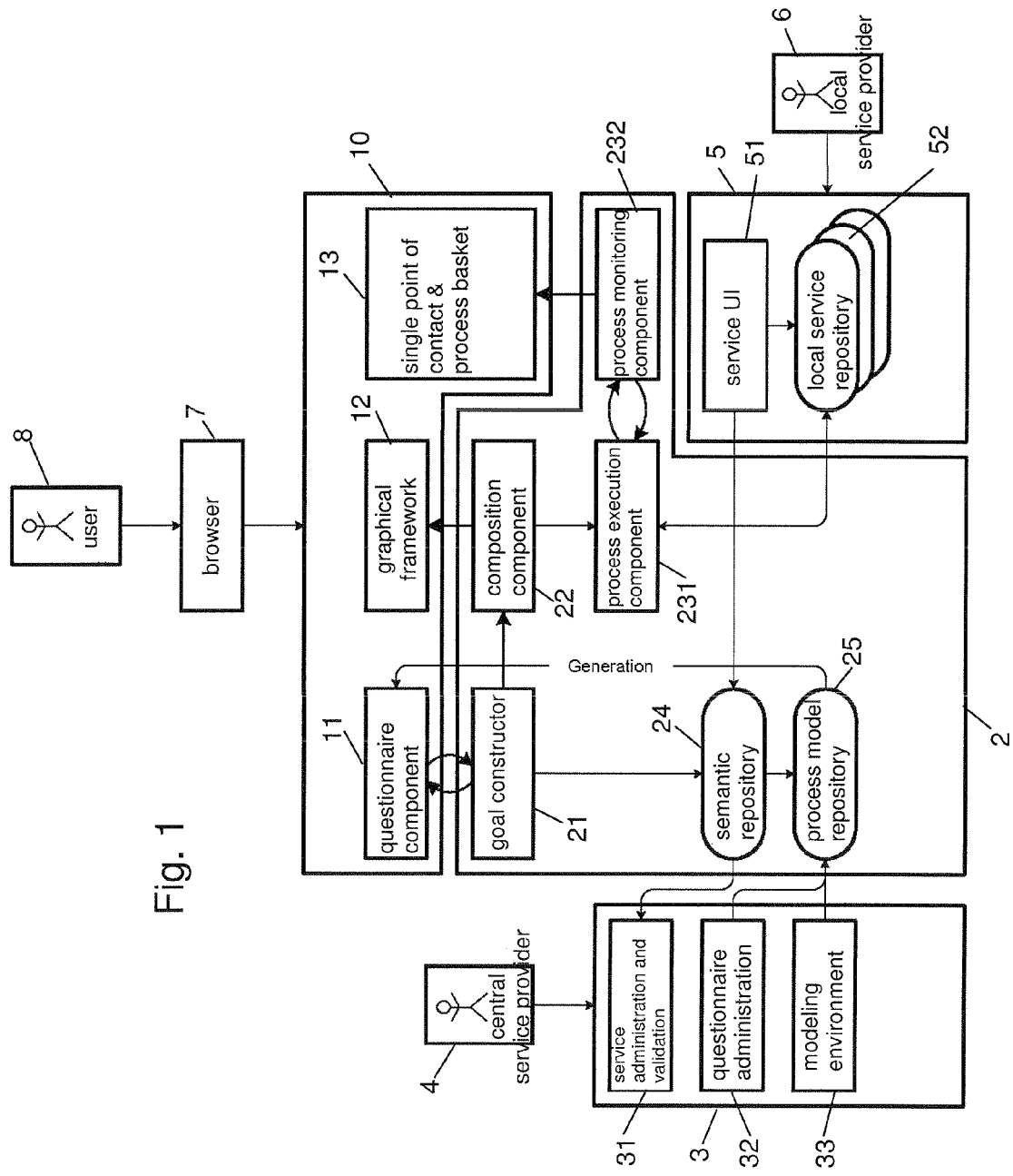
FIG. 1 shows a block diagram of an exemplary overview system for composition and execution of service processes, and peripheral systems interacting with the system.

In the following text, a detailed description of examples will be given with reference to the drawings. It should be understood that various modifications to the examples may be made. In particular, elements of one example may be combined and used in other examples to form new examples. Furthermore, it should be understood that none of the aspects, features, and/or components described within the examples are mandatory.

The term "service process" used throughout the text may refer to a web-based process being composed or combined from services. A composition of services may result in a (workflow-based) service process being executed by processing the one or more services in a sequence defined by the service process itself. The one or more services may specify one or more corresponding steps and/or tasks of the service process. The service process may be described using (i.e. in terms of) a process description. Services may be provided by one or more different service providers and may be related to one or more activities to be executed according to the process description of the service process. Accordingly, the activities may relate to executable services (e.g. checking a requestor's personal data, requesting an information from a business register, requesting a tax clearance certificate, and/or getting a work permit). The services may be executed at the location of a service provider.

Examples of service processes may be processes according to an EU "Services Directive". For example, all public authorities at different levels of granularity (e.g. on all levels of government such as local, regional, and/or governmental and of all sizes, e.g. at the level of a city council or "Gemeinde" (Municipality)) may ensure the accessibility of certain types of information. This objective could be fulfilled by offering the necessary information and/or services at least partially over the Internet. For example, a Spanish citizen wanting to open a restaurant in Cologne should have the opportunity to request corresponding licenses (or permits) independent of his current location, while being able to monitor the progress of a corresponding licensing process remotely. In other words, it might be desirable that a user may have the opportunity to request a service irrespective of his current location, while being able to monitor the progress of the service process remotely.

Furthermore, it might be desirable that a plurality of services may be provided via a single-point-of-entry to service providers. The single-point-of-entry may be referred to as a single-point-of-contact. A single-point-of-contact may serve as a unified interface to users for requesting, providing, and coordinating an execution of at least one service process.

Furthermore, it might be desirable to manage a huge number of services involving different providers, service constraints, and/or different user-contexts such as conditions and/or requirements with regard to a request and/or a user situation. For example, several thousand public authorities may be involved in handling service requests. The involvement may differ depending on a particular user-selected service type (e.g. processes for opening a café or for opening a barber shop may differ substantially). Further, as addressed above, situations in which a user requests a service may vary (e.g. to open a barber shop, suitable education is required; wherein which of the plurality of educational offerings available in different states are perceived as suitable is a non-trivial question).

Furthermore, it may be desirable not to pre-define (substantially) all possibilities for service requests and corresponding possible service processes. This would result in large numbers of configurable process models, costly to create and maintain, as well as in significant delays, since modeling and testing take significant amounts of time. Thus, it might be desirable to dynamically compose a service process (i.e. compose a service process on the fly) in accordance with a service request. In this way, interaction of a user with the system is improved and the user/administrator is relieved of the mental task of formulating possible service processes. Rather the system and method provides the user with an (optimal) service process which corresponds to the user's request, where the service process can also be monitored and/or modified by the user/administrator. Consequently, service process development is eased and improved.

Furthermore, since it might be desirable to handle a huge number of requests at (substantially) the same time, composition of service processes corresponding to the requests could be automated. Thus, it might be desirable that no user-interactions are necessary in order to generate a service process.

Furthermore, it might be desirable to collect and maintain information and/or data about a plurality of service providers involved and the services they offer.

Thus, it might be desirable to provide methods, systems, and computer program products which may be able to minimize the burden of a user when requesting a service process involving different constraints with regard to the request, a situation of the user, and/or one or more services involved in the requested service process. Furthermore, it might be desirable to guarantee a certain maximum duration for a service process and to ensure a continuous monitoring of the process execution for the user. The advantages may be achieved when combining the examples given in the following text.

Figure 2:
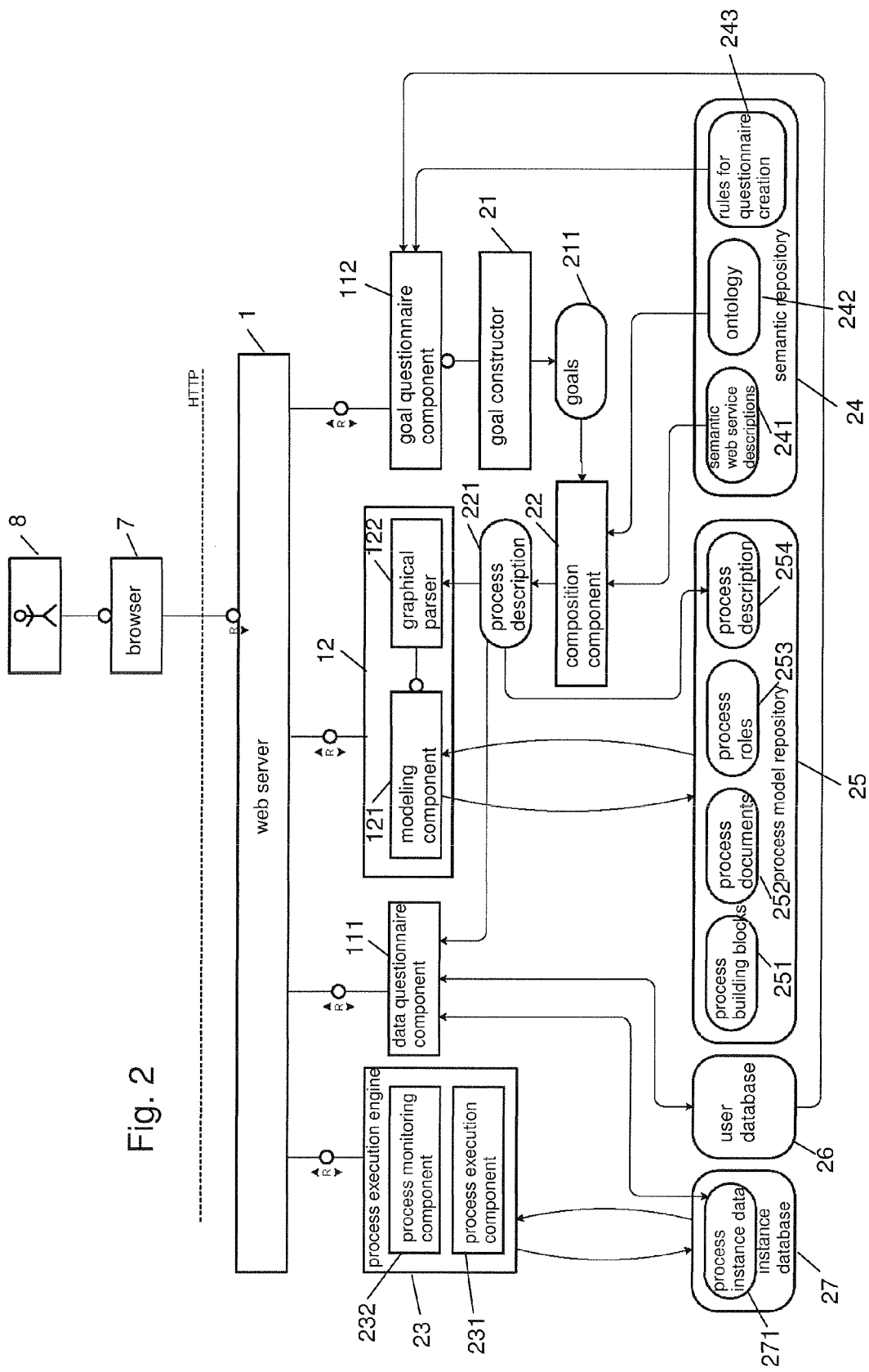
FIG. 2 shows a block diagram of an exemplary detailed system for composition and execution of service processes.

With reference to FIGS. 1 and 2, an exemplary system for automatically and dynamically composing service processes is shown. Service processes are dynamically generated in accordance with a request from a user. Accordingly, a service process is not pre-defined in the system. Rather, depending on a user-selected service type and additional constraints with regard to the user and/or the requested user-selected service type, a corresponding service process is generated. For this purpose, the service process may be specified in terms of logical state representations representing a current state and a target state. Services which can be composed to realize the service process are also described in terms of logical representations. The system is therefore able to combine services matching the logical representations of the service process which have corresponding logical representations which together can fulfill the service process.

Generation of service processes comprises composing services into a process. The services are selected from a plurality of services according to the request. No interaction with a user is required to select the services to compose the service process. The plurality of services are provided by at least one service provider and are made automatically available to the system through computer-readable descriptions such as service descriptions stored in a repository. The request comprises a user-selected service type. Examples of user-selected service types may be different kinds of licensing, e.g. a license for opening a café, for opening a barber shop, for opening a restaurant that sells alcoholic drinks, for hosting a live music performance, and/or for selling food.

In the following exemplary components of the system as shown in FIGS. 1 and 2 are described. It should be understood that the system may not comprise all of the components and/or corresponding features shown in FIGS. 1 and 2 and described below. Some of the exemplary components of the system are only shown in one of the FIGS. 1 and 2. Furthermore, FIG. 2 may be understood as a more detailed description of at least some of the components shown in FIG. 1. Same components are referenced using the same reference numbers.

A browser 7 (e.g. a web browser) provides a unique user interface (UI) to a system for service process composition, execution, and monitoring. For example, a user 8 may request data, information, and/or services through the browser 7.

A portal 10 (e.g. a central service portal) provides an interface between the browser 7 and a central services unit 2. The portal 10 may be provided in a web server 1 which is accessible through the browser 7 by the user 8. Furthermore, the web server 1 may provide access to the central services unit 2. Alternatively, the web server may comprise the central services unit 2. The portal 10 collects information from the user 8 in accordance with a request and provides the collected information to the central services unit 2. The request is sent by the user 8 to the portal 10 through the browser 7. Furthermore, the portal 10 is able to collect information in accordance with a service process. The central services unit 2, transforms the information appropriately and provides the transformed information to the browser 7. The service process is composed by the central services unit 2 based at least on the request from the user 8.

The portal 10 may comprise the following components: a questionnaire component 11, a graphical framework 12, and a single-point-of-contact 13. Alternatively, the portal 10 may provide access to the questionnaire component 11, the graphical framework 12, and the single-point-of-contact 13. The questionnaire component 11 comprises a goal questionnaire component 112 and a data questionnaire component 111. The graphical framework 12 comprises a modeling component 121 and a graphical parser 122. The single-point of contact 13 may comprise a process basket.

Upon receipt of a request from a user 8, the questionnaire component 11, in particular the goal questionnaire component 112, dynamically generates a sequence of one or more electronic inquiries in accordance with rules for questionnaire creation 243. Furthermore, the generation may be based on constraints such as the request, a user-selected service type, and/or a situation of the user 8. The constraints may be obtained by the goal questionnaire component 112 from the user 8 via a query, and/or may be retrieved by the goal questionnaire component 112 from a user database 26, from a third party, and/or from any other entity. The situation of the user 8 may relate to personal data such as a citizenship, a residence, employment data, qualifications, certificates, a state of health, etc. Furthermore, the situation or state of the user 8 may also refer to a type of service he is intended to provide, his marital status, his current residence, and/or possible plans to move. In terms of logical statements, the situation of the user 8 corresponds to the pre-condition of the goal 211 and with regard to the real world the legal situation of the user 8. For example, the situation of Pablo Benitez is that he is a Spanish citizen and that he is married to Juana Benitez. The request comprises the user-selected service type or the service type is inquired by the dynamic goal questionnaire component 112 from the user 8 prior to generating the sequence of one or more electronic inquiries. Electronic inquiries may relate to open and/or multiple choice questions, forms, and/or information requests provided (in sequence) to a user 8 through an electronic interface such as a browser 7. Furthermore, information retrieved based on an electronic inquiry may automatically trigger a subsequent electronic inquiry.

The dynamically generated sequence of one or more electronic inquiries are usable to retrieve information about the user 8 and/or the user-selected service type. The information may be retrieved from the user 8 from a user database 26, and/or from another party. The information may be usable to process the request. For example, the information is usable to subsequently compose a service process in accordance with the request. The goal questionnaire component 112 may use a rule engine to ensure that (substantially) all information necessary to compose the service process in accordance with the request, needs to be retrieved only once from the user 8. Furthermore, the rule engine may ensure that (substantially) all information necessary for the service process is entered by the user 8 into the sequence of one or more electronic inquiries.

Upon composition of the service process, the graphical framework 12 retrieves or accesses information about the service process from the central services unit 2 and renders (or visualizes) the service process in a graphical representation. Service processes can be rendered at different levels of granularity. For example, a service process displayed to a user 8 through a browser 7 may represent a current execution status of the service process. Furthermore, a service process displayed to the single-point-of-contact 13 may comprise more details compared to the service process displayed to the user 8. For visualizing a service process, the graphical parser 122 parses process descriptions 221 of the service process and generates a corresponding model of the service process in an internal format of the graphical framework 12. The modeling component 121 is usable to automatically create a layout for the service process and to render the service process in accordance with the layout into a format which can be transmitted by the web server 1 and displayed in the browser 7 to the user 8. In rendering a service process, the graphical framework 12 may use data and/or information from a process model repository 25 comprising process building blocks 251, process documents 252, and/or process roles 253. Basically, the process model may comprise data and/or information about service processes which are usable by the graphical framework. Furthermore, service processes may be specified in terms of process descriptions 221. The process descriptions 221 (possibly together with information and/or data from the process model repository corresponding to the process descriptions 221 of the service process) are usable by the graphical framework 12 to render and to display the service process. Process descriptions 221 of service processes may be persisted (i.e. stored) in process descriptions 254 of the process model repository 25.

In one example, the portal also comprises a process basket which may be part of the single-point-of-contact 13. The process basket collects (substantially) all currently running service processes, which can be represented to the user 8.

The data questionnaire component 111 is usable to create dynamic sequences of one or more electronic inquiries in accordance with at least one service process which should be executed. The electronic inquiries are usable to retrieve additional data and/or information about a user 8 and/or a user-selected service type. The additional data may be necessary to execute the service process. In order to retrieve additional data and/or information, the data questionnaire component 111 may obtain the data and/or information from the user 8

(e.g. via a query or inquiry), and/or access a user database 26. The user database 26 stores data and/or information already collected and stored about a plurality of users 8.

The central services unit 2 comprises components to compose, generate, execute, and/or monitor service processes. The central services unit 2 may be a major back-office component at the single-point-of-contact 13. The central services unit 2 may comprise a goal constructor 21, a composition component 22, a process execution engine 23, a semantic repository 24, a process model repository 25, a user database 26, and/or an instance database 27.

The goal constructor 21 is usable to generate at least one goal 211 in accordance with a request from a user 8 and/or further constraints regarding the user 8 and/or the request. The constraints may relate to a user-selected service type and/or a situation of the user 8. In other words, the goal constructor 21 takes and processes the information provided by the user 8, a user database 26, and/or a further entity or party through electronic inquiries of the goal questionnaire component 112, and derives a goal 211. The goal 211 drives and/or triggers the composition component 22. The goal constructor 21 and related components are described in greater detail below with reference to FIG. 4.

The composition component 22 is usable to create a service process based on a goal 211. The service process may be specified in terms of process descriptions 221. Basically, the composition component 22 takes the goal 211 described by the goal constructor 21 and information and/or data from the semantic repository 24, and dynamically composes and/or generates the service process in accordance with the request from the user 8. The service process comprises one or more services (which may specify process steps or tasks) necessary to obtain the goal 211. Furthermore, the service process considers one or more dependencies and/or interrelationships between the one or more services. The services and their dependencies and/or interrelationships may be described for the service process in a process description 221.

The process execution engine 23 may comprise a process monitoring component 232 and a process execution component 231. The process execution component 231 executes a service process by calling the one or more services composed to the service process from at least one service provider unit 5, where the at least one service provider unit 5 hosts the one or more services. Execution of the service process comprises providing the at least one service provider unit 5 with information necessary to execute at least one service comprised in the service process, and collecting data and/or information returned by the at least one service provider unit 5 after the service is executed by the service provider unit 5. The process monitoring component 232 monitors execution of the service process. For example, in case a deadline applies to a service of the service process and/or a deadline applies to the service process, the deadlines are monitored by the process monitoring component 232. Furthermore, the process monitoring component 232 provides the single-point-of-contact 13 with information about an execution status of the service process. Additionally, the process monitoring component 232 supports the single-point-of-contact 13 in identifying and solving problems during execution of the service process. Examples of the problems may be a missed deadline and/or requests for missing information.

Service descriptions (e.g. semantic web service descriptions) 241 describing services from one or more local service repositories 52 are aggregated in a semantic repository 24. The service descriptions 241 stored in the semantic repository 24 are usable by the single-point-of-contact 13 to compose one or more instances from a service process. An appropriate validation and governance mechanism may be applied when transferring a description of a service from the one or more local service repositories 52 to a service description 241 in the semantic repository 24. The service descriptions 241 together with at least one ontology 242 are usable by the composition component 22 to automatically compose a service process from services described in the service descriptions 241 in accordance with a request form a user 8.

In one example, the semantic repository 24 comprises a central administration registry. The central administration registry may be used with central and/or local service providers 4 and 6 (e.g. authorities and institutions involved in processing a service process). The central administration registry should be maintained by a central service provider 6 such as a central authority (e.g. a state government) and may provide access for the single-point-of-contact 13 to retrieve necessary information for the service process.

The process model repository 25 comprises a service registration and definition meta model from which models for services are derivable. More particularly, the process model repository 25 comprises process building blocks 251, process documents 252, process roles 253, and/or process descriptions 254.

A central service provider unit 3 operable by a central service provider 4 is connected to the central services unit 2. In particular, the central service provider unit 3 is connected with the semantic repository 24 and with the process model repository 25. The central service provider unit 3 comprises a service administration and validation component 31, an administration questionnaire component 32, and a modeling environment 33 connected with the process model repository 25. The service administration and validation component 31 is operable to retrieve service descriptions 241 from the semantic repository 24. The administration questionnaire component 32 is operable to take information about service processes from the process model repository 25 to generate electronic inquiries based on the information.

In other words, the components of the central service provider unit 3 may support administration and governance of information stored in the semantic repository 24, the central administration registry, service meta-models in the process model repository 25, and the administration questionnaire component 32. Administration and governance may relate to mechanisms that are able to ensure that it is clear at each point in time which of the service descriptions 241 should be applied and is thus the right one if multiple versions of service descriptions 241 corresponding to a service exist. Furthermore, administration and governance may govern update of service descriptions 241 by prescribing one or more steps that shell be followed. Furthermore, the central service provider unit 3 may assure quality for new service descriptions 241. The modeling environment 33 provides appropriate user interfaces (UIs) that may hide parts of the complexity from the central service provider 4.

A local service provider unit 5 operable by a local service provider 6 is connected to the central services unit 2. In one example, the local service provider unit 5 is connected with the semantic repository 24 and the process execution component 231. The local service provider unit 5 comprises a service administration user interface (UI) 51 and one or more local service repositories 52. Local service descriptions of the services from the one or more local service repositories 52 are provided by one or more local service providers 6. In other words, local service descriptions are not provided or maintained by the single-point-of-contact 13. Local service descriptions are instead provided by the one or more local service providers 6 through the service administration UI 51.

Information about services offered by local service providers 6 (i.e. local service descriptions) and how the services can be called by the process execution component 231 to execute a service process are provided in the one or more local service repositories 52. In addition to standard technical descriptions for services (e.g. those imposed by SOAs), the local service descriptions may additionally comprise the following information: a service address (defining how the service may be called), an actor, a service description on an abstract level, a pre-condition, a post-condition, a duration in days, and/or a fee. Information on local service providers 6 is also stored in the one or more local repositories 52.

Figure 3:
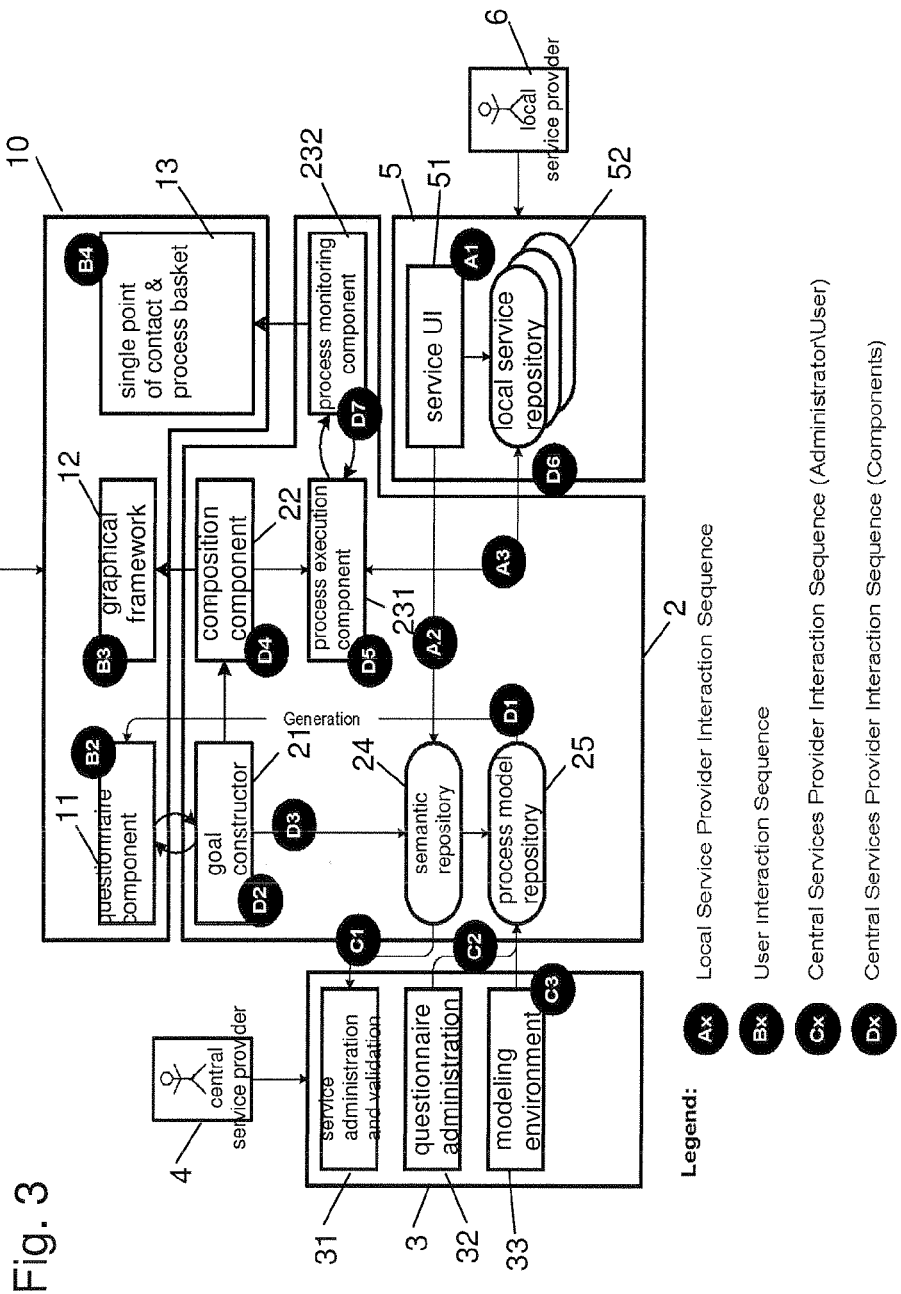
FIG. 3 shows a block diagram of exemplary interaction between components of a system for composition and execution of service processes.

With reference to FIG. 3, exemplary interactions between the components of the system as shown in FIG. 1 are described. It should be understood that not all of the interactions are mandatory for an exemplary implementation. Furthermore, it should be understood that further interactions not shown in FIG. 3 may be realized between the components of FIG. 1.

One or more users having at least three different roles can interact with the system including a central service provider 4, a local service provider 6, and a user 8. The central service provider 4 interacts or operates a central service provider unit 3 and components of a central services unit 2 being connected to the central service provider unit 3. There may be a plurality of (possibly different) central service providers 4. The local service provider 6 may represent local authorities. The local service provider 6 operates one or more local service repositories 52 which comprise services which can be registered by the central services unit 2. By registering services from the one or more local service repositories 52, the services become accessible for the central services unit 8. Each of the one or more local service repositories 52 comprises descriptions and information about services offered by a plurality of local service providers 6. The central services unit 2 may consume or request services to execute, where the services are comprised within service processes.

Referring to FIG. 3, exemplary interactions with the system from a local service provider 6 view and a corresponding local service provider unit 5 view are described. At A1, at least one local service provider unit 5 retrieves one or more services from at least one local service repository 52 through a service user interface (UI) 51. At A2, the local service provider unit 5 registers the retrieved one or more services at a semantic repository 24. Registration of one or more services may take place at design-time and may be considered to be relatively stable over time, i.e. rather rare and/or infrequent modifications and/or changes may be performed on the one or more services. Actual implementations of the one or more services remain local at the local service provider unit 5. Furthermore, the one or more local services are executed locally at the local service provider unit 5. By registering the one or more local services at the semantic repository 24, it is implied that the one or more local services can be integrated in the semantic repository 24 and therefore become accessible for a central services unit 2. At A3, execution of at least one of the one or more services is triggered by a process execution component 231 of the central services unit 2 during execution (i.e. runtime) of a service process.

Referring to FIG. 3, exemplary interactions with the system from at least one user 8 view are described. At B1, the user 8 accesses a portal 10 through a browser 7 (e.g. a web browser). Access to the portal 10 may be performed at runtime. For example, the user 8 access the portal to request a service. The request for the service may comprise a user-selected service type. The portal 10 may be implemented on a web server 1 providing unified access to the central services unit 2 through a single-point-of-contact 13. At B2, the user 8 is guided through a sequence of one or more electronic inquiries at a questionnaire component 11. The electronic inquiries are dynamically generated based on the request, the user-selected service type, and/or a situation of the user 8. For this purpose, rules for questionnaire creation 243 are used. The electronic inquiries determine the user's 8 requirements and required information in accordance with the request and related constraints. Based on the information retrieved from the user 8, a user database 26, and/or another party through electronic inquiries, a corresponding service process is automatically and dynamically generated and/or created by the central services unit 2. At B3, the user 8 can access a graphical representation of the service process, which is generated by a graphical framework 12. The graphical representation of the service process may illustrate one or more required steps or tasks to fulfill and/or match the request. Each of the one or more required steps may represent at least one service, which needs to be processed. Services may be registered at the semantic repository 24 by a local service provider 6. At B4, the user 8 can review a current state of the running service process at the single-point-of-contact 13. The single-point-of-contact 13 aggregates information about a plurality of running service processes and their associated current states.

Referring again to FIG. 3, exemplary interactions with the system from at least one central service provider 4 and a corresponding central service provider unit 4 are described. At C1, a central service provider 4 can access the semantic repository 24 through a service administration and validation component 31. The interaction with the semantic repository 24 allows the central service provider 4 to validate and/or check one or more services registered at the semantic repository. The services are registered at the semantic repository 24 by the local service provider 6. Furthermore, during the access, the central service provider 4 may perform administrative actions such as deleting, revoking, and/or suspending at least one service. Additionally, the central service provider 4 can access and administer one or more running service processes, which are currently being executed in the central services unit. At C2, the central service provider 4 specifies a general structure of possible electronic inquiries for the questionnaire component 11. The semantic repository 24 comprises the specifications in terms of rules for questionnaire creation 243 for the electronic inquiries. The questionnaire component 11 may comprise logical specifications which determine logical interdependencies between services. For example, services may comprise data interdependencies which are modeled and covered by the questionnaire component 11. Therefore, the semantic repository 24 stores a complex questionnaire model (e.g. rules for questionnaire creation 243) for a plurality of electronic inquiries, out of which one or more electronic inquiries (e.g. a questionnaire) in accordance with a request from a user 8, can be automatically generated. Since underlying service requirements and/or data dependencies frequently change over time, they need to be managed in a flexible and efficient way. The technical advantages may be achieved by storing specified electronic inquiries and their logical data interdependencies in the semantic repository 24 with regard to the electronic inquiries comprised within the rules for questionnaire creation 243. At C3, the central service provider 4 defines underlying service registration and a meta model (e.g. service descriptions 241 and/or an ontology 242) for services in the semantic repository 24, which form a basis for a process model repository 25.

Referring again to FIG. 3, possible exemplary interactions between components of a central services unit 2 are described. At D1, at a questionnaire component 11 a sequence of one or more electronic inquiries is dynamically generated based on a request from a user 8 for a service in combination with related constraints, using rules for questionnaire creation 243. The constraints may comprise a user-selected service type and/or a situation of the user 8. For generating the sequence of one or more electronic inquiries, the questionnaire component 11 uses information and/or data from the semantic repository 24 and/or from the process model repository 25. A described above, the semantic repository 24 and/or the process model repository 25 comprise information and/or data about one or more services and the services' interdependencies and/or interrelationships. At D2 and D3, a goal constructor 21 composes a goal based on information retrieved from a user 8, a user database and/or a further party or entity during interaction with the questionnaire component 11 in combination with specifications of services stored in the semantic repository 24. At D4, the goal is provided to a composition component 22. At D5, the composition component 22 generates a service process in accordance with the goal. The service process may relate to an executable process description 221 of the request and the corresponding goal. The service process comprises a sequence of one or more services providing steps or tasks to fulfill and/or match the goal. At D5, the service process is automatically deployed at a process execution component 231. Then execution of the service process is triggered at the process execution component 231. During execution of the service process, at D6, execution orchestrates invocation of actual implementations of the one or more services, which are stored in the one or more local service repositories 52 and executed at the local service provider unit 5. At D7, a process execution engine 23 comprising the process execution component 231 publishes information about a current state of the running service process to a process monitoring component 232. The process monitoring component 232 allows the user 8 to check the current state of the running service process.

Figure 4:
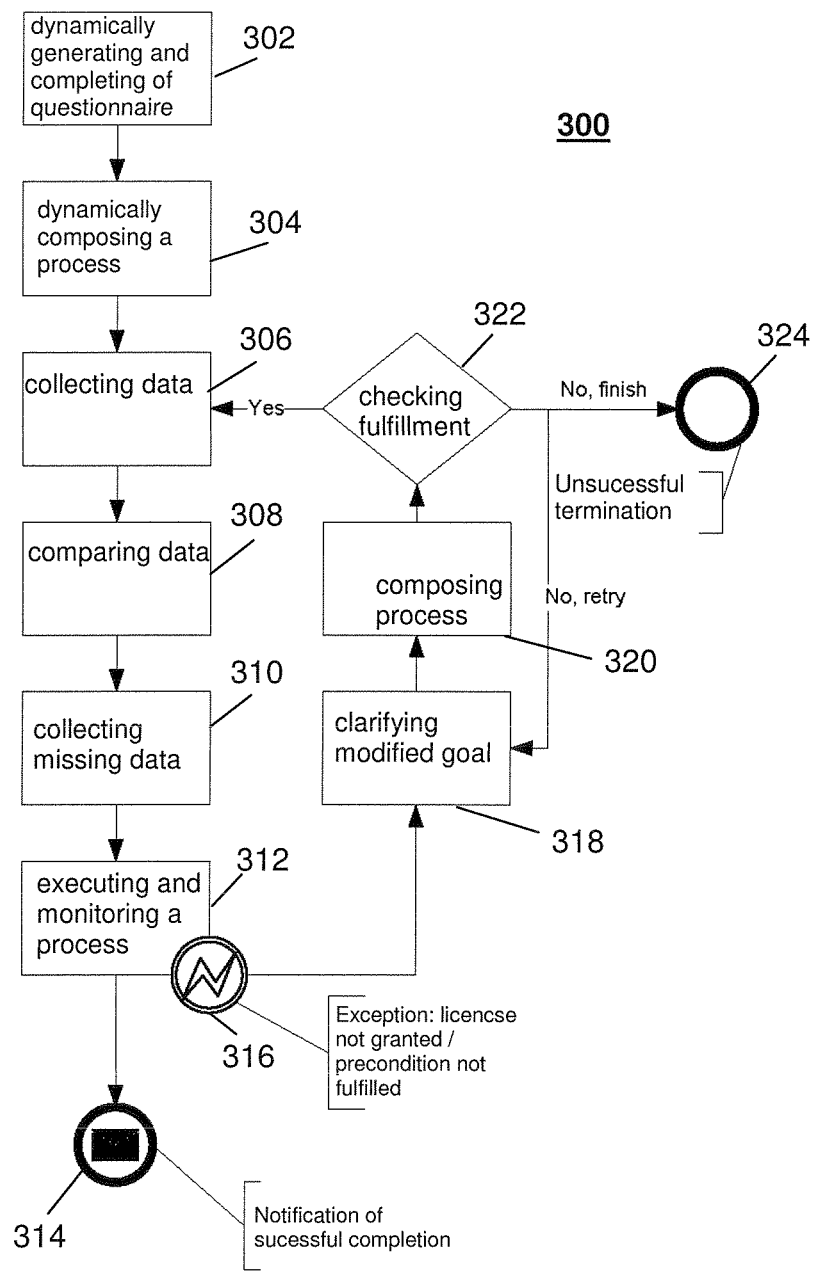
FIG. 4 shows a flow diagram of an exemplary method for dynamically composing and executing service processes.

With reference to FIG. 4, an exemplary implementation of a method 300 for automatically and dynamically generating and executing service processes using at least some of the system components shown in FIGS. 1 and 2 is shown. It should be understood that the method may not comprise all of the described method steps.

A user 8 (e.g. a human agent of a single-point-of-contact 13 or an applicant) interacts with a web server 1, possibly through a portal 10 hosting a single-point-of-contact 13, through a browser 7. The interaction may be performed for the purpose of requesting a service (e.g. a request for a license of his/her choice).

At 302, a sequence of one or more electronic inquiries is dynamically generated by a dynamic goal questionnaire component 112 and completed by the user 8, automatically by accessing a user database 26, and/or by another party having sent a request. The sequence of one or more electronic inquiries are dynamically generated (i.e. generated on the fly) based on the request, a user-selected service type (e.g. the type of license), conditions and/or constraints with regard to the user-selected service type, and/or a situation of the user 8. Additionally, the electronic inquiries are generated using rules for questionnaire creation 243, information and/or data that may be relevant to process the request from the user 8. The rules for questionnaire creation 243 may be specified by a service provider and/or a specialist who may be aware of which information may be required from a user in the user's specific situation. For example, the rules for questionnaire creation 243 may determine that information about the parents are needed if a user requests for a work permission for the case the user is not a citizen of the state in which the user wants to offer a service and/or to open a business. For example, after the user 8 has selected the user-selected service type (e.g. a license type such as a license to open a café in Cologne), the rules for questionnaire creation 243 guide the dynamic goal questionnaire component 112 to information which is relevant to the user-selected service type (e.g. is the user 8 interested in hosting live music performances or selling food to the public), and hence to generate the sequence of one or more electronic inquiries. The electronic inquiries are filled in by the user 8, automatically by accessing a user database 26, and/or by another party such that the dynamic goal questionnaire component 112 retrieves the information. Questioning and retrieving information in accordance with the request may be an iterative procedure of data entering and rule evaluation (e.g. based on the entered and/or retrieved data and/or the rules for questionnaire creation 243). Therefore, generating the sequence of one or more electronic inquiries is referred to as a dynamic process executed in an automated manner.

After having retrieved the information with regard to the request and the user-selected service type, the dynamic goal questionnaire component 112 retrieves information and/or data with regard to a situation of the user 8 (e.g. a Spanish citizen with education certificates from the Netherlands and an Italian wife). Information with regard to the situation of the user 8 may be inquired by the user 8 through one or more electronic inquiries and/or may be automatically retrieved from a user database 26. The user database 26 may store information and/or data regarding the situations of a plurality of users 8. The dynamic goal questionnaire component 112 may specify (e.g. using rules for questionnaire creation 243) which information and/or data about the situation of the user 8 needs to be retrieved based on the user-selected service type.

At 304, the information retrieved from the user 8 and gained from the dynamic goal questionnaire component 112 is taken as input to a goal constructor 21. The goal constructor 21 generates a (semantic) goal 211 for the request in accordance with the information. The information comprises at least information on the current situation of the user 8, the user-selected service type, and/or constraints and/or parameters relevant to the user-selected service type. The goal constructor 21 interprets the information and constructs logical state representations of a current state (e.g. a current situation of the user 8) and a target situation (e.g. having the user-selected service type fulfilled and/or obtained). The current state constitutes at least one pre-condition of the goal 211 and the target state constitutes a post-condition of the goal 211.

The goal 211 computed by the goal constructor 21 is usable by a composition component 22 to automatically and dynamically compose a service process based on a sequence of one or more services which, started from the current state, gets the user 8 to the target state of having the user-selected service type provided. With the goal 211, the composition component 22 is invoked and the task of the composition component 22 is to find a service process based on a sequence of one or more services which together may fulfill and/or match the goal 211. The one or more services are selected from a plurality of services. The plurality of services may be provided by at least one local service provider unit 5 and may be described by (semantic web) service descriptions 241 in a semantic repository 24. In particular, the service descriptions 241 may comprise descriptions of each of the plurality of services in terms of their pre-conditions and post-conditions. The composition component 22 uses the available service descriptions 241 and at least one ontology 242 (e.g. comprising a meta model of services) from the semantic repository 24, and automatically composes a service process in terms of a process description 221. The service descriptions 241 may be abstract descriptions of one or more process building blocks 251. The process building blocks 251 may reside in a process model repository 25. In other words, the service descriptions 241 may comprise a grounding for the process building blocks 251. A differentiation between the semantic repository 24 and the process model repository 25 may be a logical one. Therefore, in one example, the semantic repository 24 and the process model repository 25 may be implemented as a single repository. The implementation of the semantic repository 24 and the process model repository 25 may impact pragmatics of life-cycle management of the process building blocks 251.

The process building blocks 251 specify one or more of the following information in addition to the pre-conditions and the post-conditions of each service in the plurality of services described in the service descriptions 241:
  input data (e.g. name, maiden name, address, data of birth, passport number,
  local service provider units 5 and/or central service provider units 4 involved in processing at least one service process,
  a maximum duration, and/or
  a price.

In one exemplary aspect and to provide overview information on the service process generated in accordance with the request from the user 8, respective sums of the maximum durations and prices of the one or more services constituting the service process are calculated. Possibly dependent on an execution semantics of a process execution language used to execute instances of the service process, a maximum process duration may be calculated as the sum of the maximum durations of at least one longest sequence of continuous services in the service process. The sum of the costs may be calculated by determining the sum of all costs of the services involved in the service process. Furthermore, to reduce the maximum process duration of the service process, the composition component 22 may parallelize the service process to a (substantially) maximum degree, if possible. Parallelization of the service process may be performed by determining those services involved in the service process which do not depend on other services involved in the service process and executing the independent services in parallel.

Figure 4A:
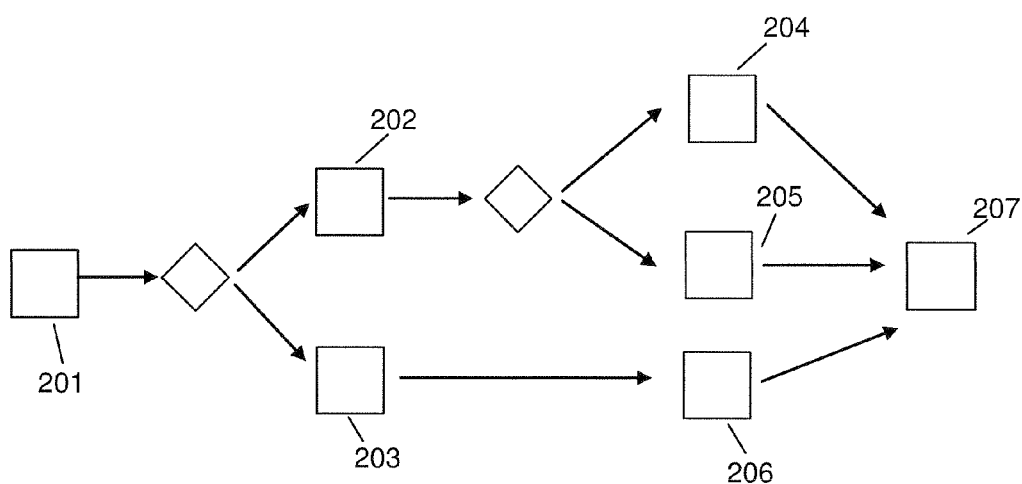
FIG. 4A shows an example of a service process.

FIG. 4A shows an exemplary service process 200 which is composed of a sequence of services 201, 202, 203, 204, 205, 206, 207. Since for example services 202 and 203 do not depend on other services involved in the service process 200, services 202 and 203 can be executed in parallel. In this way a total execution time of the service process 200 can be reduced.

In one exemplary aspect, the service process is persisted in the process model repository 25. More particularly, the process descriptions 221 of the service process are stored in process descriptions 254. Furthermore, the service process can be displayed to the user 8 (e.g. on a web site) through a browser 7 by using a graphical framework 12. The graphical framework automatically creates a layout for the composed service process using the corresponding process descriptions 221. The graphical framework 12 comprises a graphical parser 122 which parses the process descriptions 221 and generates a corresponding process model in an internal format of the graphical framework 12. Furthermore, the graphical framework 12 comprises a modeling component 121. The modeling component 121 can automatically create a layout for the process model and render the process model into a format that can be transmitted by the web server 1 and displayed in the browser 7 to the user 8. During the rendering process, the graphical framework 12 may make use of contents stored in the process model repository 25. In one exemplary implementation, Scalable Vector Graphics (SVG) may be used to render and display the service process to the user 8.

Once the service process is rendered and graphically displayed to the user 8, the user 8 may select to start and/or invoke execution of the service process. At 306, a process execution engine 23 determines and/or clarifies whether input data which is required to execute the service process is already available. The determination may be performed by iterating over each of the services comprised in the service process and thereby collecting required input data from at least one of the services. At 308, the collected input data is consolidated. Consolidating input data may comprise checking whether the same input data is used by more than one service. The consolidation may be based on data standards such as UN/CEFACT CCTS. At 308, the process execution engine 23 may compare (e.g. using the same or similar techniques as those used for the consolidation) whether the consolidated input data is already available in a user database 26, or whether data is still missing and thus need to be entered by the user 8. If data is missing, at 310, the missing data is requested from the user 8 through a data questionnaire component 111. The user 8 is provided with one or more electronic inquiries generated using rules for questionnaire creation 243 and based on the missing data which the user 8 has to fill in. The data gained at the data questionnaire component 111 may be stored in the user database 26 (e.g. if legally permissible and agreed to by the user 8). Similar to the dynamic goal questionnaire component 112, the data questionnaire component 111 collects necessary data once, before performing any processing. Consequently, using a dynamic goal questionnaire component 112 and a data questionnaire component 111 having the described functionality may be a significant benefit for the user 8, since they may speed up the process and massively lower the burden of filling in forms in comparison to today's questionnaire tools.

At 312, the process execution engine 23 starts execution of the service process selected by the user 8. In one exemplary implementation, the process execution engine 23 may be a standard WSBPEL workflow execution engine. In case the service process is represented in a format not interpretable by the process execution engine 23, a translation is performed. Execution of the service process may be monitored by a monitoring component 232, while actual process control may remain with a process execution component 231. During execution of the service process, corresponding process instance data 271 may be persisted in an instance database 27. The instance database 27 may be used for purpose of potential auditing later on.

After having executed the service process, at 314 the user 8 receives a notification of successful completion of the service process. In one exemplary aspect, the user 8 may be notified on a web site accessible through the browser 7, through a single-point-of-contact 13, and/or by email. Otherwise, if an exception occurred during execution of the service process (e.g. a license can not be granted and/or a pre-condition is not fulfilled), the user 8 is notified (e.g. via email) of the exception. Furthermore, the user 8 may be provided with one or more alternative service types. The options may be present through the dynamic goal questionnaire component 112 to the user 8. At 318, the user 8 may choose an alternative service type through dynamic interaction with the dynamic goal questionnaire component 112 and an alternative goal is constructed by the goal constructor 21 in accordance with the new service type. At 320, the composition component 22 is invoked based on the alternative goal together with a current state of the service process. If a satisfactory solution can be found (322), the procedure as described above is restarted at the point where the input data required to execute the now alternative service process is collected (306). Additional data that was not required for the original service process is collected from the user 8. Otherwise, if no satisfactory solution can be found for the user 8, even if multiple alternatives are considered, execution of the service process is terminated in an unsuccessful state (324).

Figure 5:
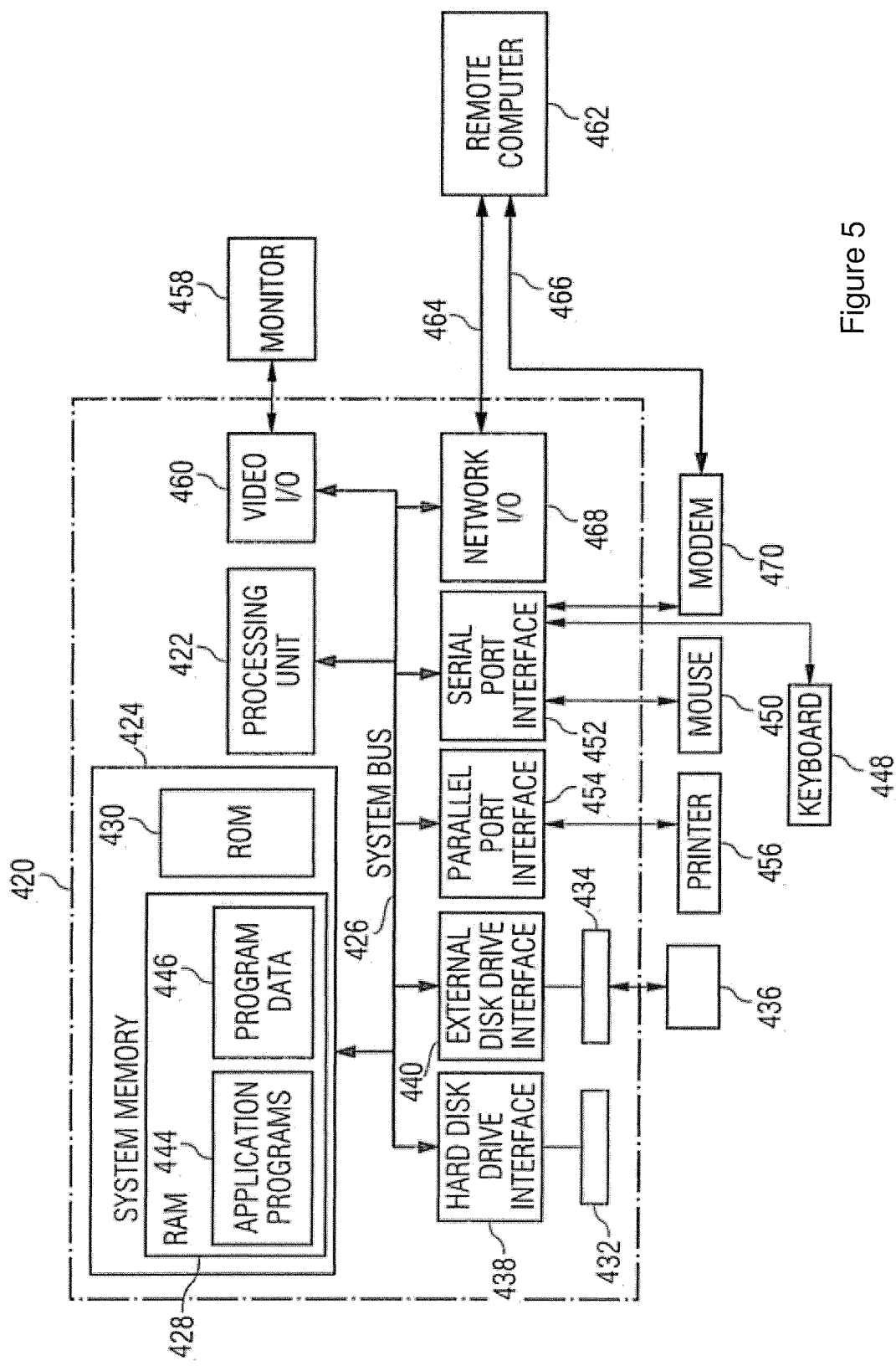
FIG. 5 shows a block diagram of an exemplary computer (network) system.

With reference to FIG. 5, an exemplary system for implementing the invention includes a general purpose computing device in the form of a conventional computing environment 420 (e.g. personal computer), including a processing unit 422, a system memory 424, and a system bus 426, that couples various system components including the system memory 424 to the processing unit 422. The processing unit 422 may perform arithmetic, logic and/or control operations by accessing system memory 424. The system memory 424 may store information and/or instructions for use in combination with processing unit 422. The system memory 424 may include volatile and non-volatile memory, such as random access memory (RAM) 428 and read only memory (ROM) 430. A basic input/output system (BIOS) containing the basic routines that helps to transfer information between elements within the personal computer 420, such as during start-up, may be stored in ROM 430. The system bus 426 may be any of several types of bus structures including a memory bus or memory controller, a peripheral bus, and a local bus using any of a variety of bus architectures.

The personal computer 420 may further include a hard disk drive 432 for reading from and writing to a hard disk (not shown), and an external disk drive 434 for reading from or writing to a removable disk 436. The removable disk 436 may be a magnetic disk for a magnetic disk driver or an optical disk such as a CD ROM for an optical disk drive. The hard disk drive 434 and external disk drive 434 are connected to the system bus 426 by a hard disk drive interface 438 and an external disk drive interface 440, respectively. The drives and their associated computer-readable media provide nonvolatile storage of computer-readable instructions, data structures, program modules and other data for the personal computer 420. The data structures may include relevant data of the implementation of the computer-implemented method, system, and computer program product for automatically and dynamically composing and executing workflow-based service processes as described in more detail above. The relevant data may be organized in a database, for example a relational or object database.

Although the exemplary environment described herein employs a hard disk (not shown) and an external disk, it should be appreciated by those skilled in the art that other types of computer-readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 430 or RAM 428, including an operating system (not shown), one or more application programs 444, other program modules (not shown), and program data 446. The application programs 444 may include at least a part of the functionality as detailed in FIGS. 1 to 3.

A user may enter commands and information, as discussed below, into the personal computer 420 through input devices such as keyboard 448 and mouse 450. Other input devices (not shown) may include a microphone (or other sensors), joystick, game pad, scanner, or the like. These and other input devices may be connected to the processing unit 422 through a serial port interface 452 that is coupled to the system bus 426, or may be collected by other interfaces, such as a parallel port interface 454, game port or a universal serial bus (USB). Further, information may be printed using printer 456. The printer 456 and other parallel input/output devices may be connected to the processing unit 422 through parallel port interface 454. A monitor 458 or other type of display device is also connected to the system bus 426 via an interface, such as a video input/output 460. In addition to the monitor, computing environment 420 may include other peripheral output devices (not shown), such as speakers or other audible output.

The computing environment 420 may communicate with other electronic devices such as a computer, telephone (wired or wireless), personal digital assistant, television, or the like. To communicate, the computer environment 420 may operate in a networked environment using connections to one or more electronic devices. FIG. 5 depicts the computer environment networked with remote computer 462. The remote computer 462 may be another computing environment such as a server, a router, a network PC, a peer device or other common network node, and may include many or all of the elements described above relative to the computing environment 420. The logical connections depicted in FIG. 5 include a local area network (LAN) 464 and a wide area network (WAN) 466. Such networking environments are commonplace in offices, enterprise-wide computer networks, intranets and the Internet.

When used in a LAN networking environment, the computing environment 420 may be connected to the LAN 464 through a network I/O 468. When used in a WAN networking environment, the computing environment 420 may include a modem 470 or other means for establishing communications over the WAN 466. The modem 470, which may be internal or external to computing environment 420, is connected to the system bus 426 via the serial port interface 452. In a networked environment, program modules depicted relative to the computing environment 420, or portions thereof, may be stored in a remote memory storage device resident on or accessible to remote computer 462. Furthermore other data relevant to the application of the method for automatically and dynamically composing and executing workflow-based service processes (described in more detail further above) may be resident on or accessible via the remote computer 462. The data may be stored for example in an object or a relation database. It will be appreciated that the network connections shown are exemplary and other means of establishing a communications link between the electronic devices may be used.

The above-described computing system is only one example of the type of computing system that may be used to implement the method for automatically and dynamically composing and executing workflow-based service processes.

What is claimed is:

1. A computer-implemented method for composing and executing service processes, the method comprising:
receiving a request from a user, the request comprising a user-selected service type;
guided by one or more rules for questionnaire creation, dynamically generating, by a processor, a sequence of one or more electronic inquiries for a previously undefined service process in accordance with the user-selected service type, the one or more electronic inquiries being usable to retrieve information about the user and the user-selected service type;
retrieving information related to the user and the user-selected service type based on the sequence of the one or more electronic inquiries;

based on the information received, creating a goal for the request by constructing logical state representations of a current state constituting a pre-condition of the goal and of a target state constituting a post-condition of the goal;

generating the previously undefined service process by determining a sequence of services which together fulfill the goal, wherein the services are selected from a plurality of services such that pre-conditions and post-conditions associated with the selected services together match the pre-condition and the post-condition of the goal; and retrieving information about the previously undefined service process and rendering the previously undefined service process to the user in a graphical representation.

2. The computer-implemented method as in claim 1 wherein the plurality of services and their associated pre-conditions and post-conditions are specified in service descriptions, the service descriptions comprising a grounding to at least one process building block, wherein the at least one process building block comprises data concerning a user, one or more service provider units involved in performing at least one activity associated with at least one service, a maximum duration associated with each service of the plurality of services, and costs associated with each service of the plurality of services.

3. The computer-implemented method as in claim 1 further comprising parallelizing the previously undefined service process by determining a plurality of services from the sequence of services of the previously undefined service process which do not depend on other services of the sequence of services, and by executing the plurality of services in parallel.

4. The computer-implemented method as in claim 1 wherein generating the previously undefined service process further comprises calculating a maximum service process duration as the sum of durations of each of one or more services from the sequence of services, wherein the one or more services define a longest path of continuous steps through the previously undefined service process.

5. The computer-implemented method as in claim 4 further comprising calculating a maximum cost for the previously undefined service process as the sum of costs associated with each of the services from the sequence of services.

6. The computer-implemented method as in claim 1 further comprising:

if during execution of the previously undefined service process an exception occurs, notifying a user;

providing the user with one or more options to alter the user-selected service type; and after having received additional information according to the altered user-selected service type, generating a modified goal and modifying the previously undefined service process in accordance with the modified goal.

7. The computer-implemented method as in claim 1 further comprising displaying the previously undefined service process at different levels of granularity to a user through a browser.

8. A computer system including computer-executable code recorded on a non-transitory computer-readable medium for automatically and dynamically composing and executing service processes, the system comprising:

a questionnaire component that is configured via the computer-executable code to:

receive a request from a user, the request comprising a user-selected service type; and guided by one or more rules for questionnaire creation, dynamically generate a sequence of one or more electronic inquiries for a previously undefined service process in accordance with the user-selected service type, the one or more electronic inquiries being usable to retrieve information about the user and the user-selected service type;

a goal constructor that is configured via the computer-executable code to:

retrieve information related to the user and the user-selected service type based on the sequence of the one or more electronic inquiries; and based on the information received, create a goal for the request by constructing logical state representations of a current state constituting a pre-condition of the goal and of a target state constituting a post-condition of the goal;

a composition component that is configured via the computer-executable code to generate the previously undefined service process by determining a sequence of services which together fulfill the goal, wherein the services are selected from a plurality of services such that pre-conditions and post-conditions associated with the selected services together match the pre-condition and the post-condition of the goal; and a graphical framework that is configured via the computer-executable code to:

retrieve information about the previously undefined service process and render the previously undefined service process to the user in a graphical representation.

9. The computer system of claim 8 further comprising service descriptions comprising specifications of the plurality of services, the service descriptions comprising a grounding to at least one process building block, wherein the at least one process building block comprises data related to a user, one or more service provider units involved in performing at least one activity associated with at least one service, a maximum duration associated with each service of the plurality of services, and costs associated with each service of the plurality of services.

10. The computer system of claim 8 wherein the composition component is further configured via the computer-executable code to parallelize the previously undefined service process by determining a plurality of services from the sequence of services of the previously undefined service process which do not depend on other services of the sequence of services, and by executing the plurality of services in parallel.

11. The computer system of claim 8 wherein the composition component is further configured via the computer-executable code to calculate a maximum service process duration as the sum of durations of each of one or more services from the sequence of services, wherein the one or more services define a longest path of continuous steps through the previously undefined service process.

12. The computer system of claim 11 wherein the composition component is further configured via the computer-executable code to calculate a maximum cost for the previously undefined service process as the sum of costs associated with each of the services from the sequence of services.

13. The computer system of claim 8 further comprising a single-point-of-contact, the single-point-of-contact being configured via the computer-executable code to:

if during execution of the previously undefined service process an exception occurs, notify a user;

provide the user with one or more options to alter the user-selected service type; and after having received additional information according to the altered user-selected service type from the user, generate a modified goal and modify the previously undefined service process in accordance with the modified goal.

14. A computer program product for composing and executing service processes and being tangibly embodied on a non-transitory computer-readable medium and comprising instructions that, when executed, cause a data processing apparatus to:
 receive a request from a user, the request comprising a user-selected service type;
 guided by one or more rules for questionnaire creation, dynamically generate a sequence of one or more electronic inquiries for a previously undefined service process in accordance with the user-selected service type, the one or more electronic inquiries being usable to retrieve information about the user and the user-selected service type;
 retrieve information related to the user and the user-selected service type based on the sequence of the one or more electronic inquiries;
 based on the information received, create a goal for the request by constructing logical state representations of a current state constituting a pre-condition of the goal and of a target state constituting a post-condition of the goal;
 generate the previously undefined service process by determining a sequence of services which together fulfill the goal, wherein the services are selected from a plurality of services such that pre-conditions and post-conditions associated with the selected services together match the pre-condition and the post-condition of the goal; and
 retrieve information about the previously undefined service process and render the previously undefined service process to the user in a graphical representation.

15. The computer program product of claim 14 wherein the plurality of services and their associated pre-conditions and post-conditions are specified in service descriptions, the service descriptions comprising a grounding to at least one process building block,
 wherein the at least one process building block comprises data concerning a user, one or more service provider units involved in performing at least one activity associated with at least one service, a maximum duration associated with each service of the plurality of services, and costs associated with each service of the plurality of services.

16. The computer program product of claim 14 further comprising instructions that, when executed, cause the data processing apparatus to parallelize the previously undefined service process by determining a plurality of services from the sequence of services of the previously undefined service process which do not depend on other services of the sequence of services, and by executing the plurality of services in parallel.

17. The computer program product of claim 14 wherein the instructions that cause the data processing apparatus to generate the previously undefined service process further comprise instructions that, when executed, cause the data processing apparatus to calculate a maximum service process duration as the sum of durations of each of one or more services from the sequence of services, wherein the one or more services define a longest path of continuous steps through the previously undefined service process.

18. The computer program product of claim 17 further comprising instructions that, when executed, cause the data processing apparatus to calculate a maximum cost for the previously undefined service process as the sum of costs associated with each of the services from the sequence of services.

19. The computer program product of claim 14 further comprising instructions that, when executed, cause the data processing apparatus to:
 if during execution of the previously undefined service process an exception occurs, notify a user;
 provide the user with one or more options to alter the user-selected service type; and
 after having received additional information according to the altered user-selected service type, generate a modified goal and modify the previously undefined service process in accordance with the modified goal.

20. The computer program product of claim 14 further comprising instructions that, when executed, cause the data processing apparatus to display the previously undefined service process at different levels of granularity to a user through a browser.

* * * * *